(12) United States Patent
Viegas Wentz et al.

(10) Patent No.: US 11,988,527 B2
(45) Date of Patent: May 21, 2024

(54) PROTECTION MODULES FOR ON-BOARD ELECTRONICS AND INTERCONNECTION METHOD

(71) Applicants: PETRÓLEO BRASILEIRO S.A.—PETROBRÁS, Rio de Janeiro (BR); SERVIÇO NACIONAL DE APRENDIZAGEM INDUSTRIAL—SENAI, Porto Alegre (BR)

(72) Inventors: André Viegas Wentz, Porto Alegre (BR); Cristiane Mioto Becker, Porto Alegre (BR); Enzo Costamilan, Porto Alegre (BR); Eduardo Gerhardt, Porto Alegre (BR); Hugo Francisco Lisboa Santos, Rio de Janeiro (BR)

(73) Assignees: PETRÓLEO BRASILEIRO S.A.—PETROBRÁS, Rio de Janeiro (BR); SERVIO NACIONAL DE APRENDIZAGEM INDUSTRIAL—SENAI, Porto Alegre (BR)

( * ) Notice: Subject to any disclaimer, the term of this patent is extended or adjusted under 35 U.S.C. 154(b) by 272 days.

(21) Appl. No.: 17/622,591

(22) PCT Filed: Jun. 18, 2020

(86) PCT No.: PCT/BR2020/050216
§ 371 (c)(1),
(2) Date: Dec. 23, 2021

(87) PCT Pub. No.: WO2020/257899
PCT Pub. Date: Dec. 30, 2020

(65) Prior Publication Data
US 2022/0356799 A1 Nov. 10, 2022

(30) Foreign Application Priority Data

Jun. 24, 2019 (BR) ...................... 10 2019 013128 4

(51) Int. Cl.
*H02G 3/04* (2006.01)
*G01D 11/24* (2006.01)

(52) U.S. Cl.
CPC ........... *G01D 11/24* (2013.01); *H02G 3/0462* (2013.01)

(58) Field of Classification Search
CPC ................................................... H02G 3/0462
See application file for complete search history.

(56) References Cited

U.S. PATENT DOCUMENTS

| 5,400,298 A | 3/1995 | Hepp |
| 6,434,317 B1 | 8/2002 | Dyer et al. |

(Continued)

FOREIGN PATENT DOCUMENTS

| EP | 1 481 266 B1 | 10/2011 |
| WO | WO 01/13692 A1 | 2/2001 |

OTHER PUBLICATIONS

International Search Report for PCT/BR2020/050216 dated Sep. 17, 2020.

(Continued)

*Primary Examiner* — Hung V Ngo
(74) *Attorney, Agent, or Firm* — Birch, Stewart, Kolasch & Birch, LLP

(57) ABSTRACT

The present invention is used to compose the structure of a system that operates inside pipelines. It can be used in a robotic system in the form of a train to move tools inside small diameter tubes or ducts. It avoids the need for costly commercial connectors with limited variety of connections. The proposed solution is to partition/separate the electronic or hydraulic components into pressure vessel modules, (Continued)

thereby making it necessary to provide an adequate means of interconnection between said modules by means of an elastomeric conduit. Each module has a heat exchanger system (sink) to remove the heat generated by the electronic equipment installed inside thereof. The product of the invention has a sufficient degree of freedom to move in ducts and underwater pipes, where the hydrostatic pressure is extremely high.

6 Claims, 4 Drawing Sheets

(56) References Cited

U.S. PATENT DOCUMENTS

| | | | |
|---|---|---|---|
| 6,568,501 B2 | 5/2003 | Paulsson | |
| 6,744,965 B2 | 6/2004 | Arab-Sadeghabadi et al. | |
| 6,769,487 B2 | 8/2004 | Hache | |
| 6,888,972 B2 | 5/2005 | Berg et al. | |
| 7,246,940 B2 | 7/2007 | Storm et al. | |
| 8,024,936 B2 | 9/2011 | Storm et al. | |
| 2005/0146984 A1* | 7/2005 | Lee | G01V 1/201 367/20 |
| 2021/0372556 A1* | 12/2021 | Salvi Dos Reis | F16L 55/40 |
| 2023/0167734 A1* | 6/2023 | Zimmerman | H05K 5/06 361/748 |

OTHER PUBLICATIONS

Written Opinion of the International Searching Authority for PCT/BR2020/050216 (PCT/ISA/237) dated Sep. 17, 2020.

\* cited by examiner

PROTECTION MODULES FOR ON-BOARD ELECTRONICS AND INTERCONNECTION METHOD

FIELD OF INVENTION

The functioning of a robotic system depends on several electrical and electronic components that are not designed to withstand the large hydrostatic pressures found in underwater environments. In some cases, they are still sensitive components, where variations in fluid pressure around them can affect the accuracy of their operation. In order for this robot to operate in an environment such as inside pipelines at high pressures and temperatures, the electronic components thereof must be protected in a rigid structure, but which is slender in order not to compromise the internal space.

Another factor that makes the use of robots in pipelines difficult is the fact that the electronic components are fragmented into different modules to fit inside the pipelines and pass through the curves and intersections of the path. They must do this while maintaining the electrical and data interconnection, thus requiring more interconnections the smaller the dimensions of the ducts are. In some cases, the robot not only needs to be electrically interconnected, but also has hydraulic ways, which must occupy the same space already occupied by the structure and electronic components, making an innovative solution necessary to make such a passage possible.

An important issue is that these electronic components produce thermal energy during their operation and this generated heat needs to be effectively and above all efficiently removed from the internal environment, where the electronics are mounted, to the external environment. In some cases, it is not feasible to assemble these components in the module structure, either because of its geometry, or because it is not a material that conducts heat properly.

DESCRIPTION OF PRIOR ART

Before the invention, the space used by the metallic structure that protects the electronics consumed a lot of space in the system, preventing it from being applied to ducts with a smaller section, such as the 4-inch ones used in the Oil and Gas industry, for example. The number and types of connections between robot modules were limited to the commercial connectors available. These in turn have little variety and are also bulky occupying a lot of space in the modules.

Document U.S. Pat. No. 6,434,317 discloses a pressure vessel for housing electronic components in an underwater environment and allowing the connection of components to signal transmission elements of a signal cable. Document US2002064367 discloses a cylindrical-shaped pressure vessel capable of withstanding high hydrostatic pressures and also withstanding high temperatures, showing the ability to isolate the passage of essential wires and connections in optical fiber data transmission. Document WO2001013692 discloses a pressure vessel for passively conducting heat generated by electronic components inside thereof.

Both documents cited as state of the art reveal pressure vessels capable of containing electronic components, connectors, seals, packings, etc., but none of them is capable of solving the problem of movement inside small diameter pipes. In other words, none of the prior art documents are adapted for mobility within ducts and pipelines having reduced diameters.

BRIEF DESCRIPTION OF THE INVENTION

The present invention is used to compose the structure of a system that operates inside pipelines. It can be used in a robotic system in the form of a train to move tools inside small diameter tubes or ducts. It avoids the need for costly commercial connectors with limited variety of connections.

The proposed solution is to partition/separate the electronic or hydraulic components into pressure vessel modules, thereby making it necessary to provide an adequate means of interconnection between the modules by means of an elastomeric conduit. Each module has a heat exchanger system (sink) to remove the heat generated by the electronic equipment installed inside thereof. The product of the invention has a sufficient degree of freedom to move in ducts and underwater pipes, where the hydrostatic pressure is extremely high.

BRIEF DESCRIPTION OF THE DRAWINGS

The present invention will be described in more detail below, with reference to the attached figures which, in a schematic and non-limiting way, represent examples of the configuration thereof. In the drawings, there are.

DETAILED DESCRIPTION OF THE INVENTION

Figure 1:
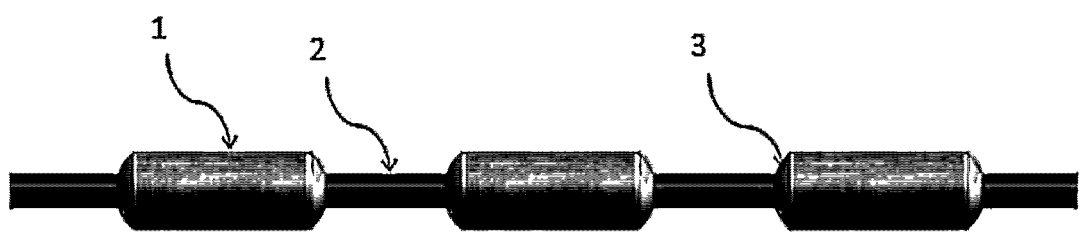
FIG. 1 illustrates a representative side view of the integrated modules without hoses.

With the application of a laminated carbon fiber material, it was possible to reduce the thickness of the pressure vessel wall where the on-board electronics are conditioned. Since the manufacturing process for this type of material is additive rather than subtractive, as in the machining of metal billets, the production of waste and the cost of manufacturing is reduced.

The invention allows any type of conductor to be conditioned in the connection between the modules (1), and for these to enter the pressure vessels without the need for exclusive connectors for such. This is done by making an elastomeric conduit, called a penetrator (2). In a rubber injection mold (12), where the pressure vessel lids (3) are placed as inserts, it is possible to obtain an ideal adhesion between the lid material (3) and the penetrator elastomer (2). For this, before the rubber injection and vulcanization step, the covers are prepared with wires/cables (18) that pass through conical holes (14) in the covers (3), where they are partially filled with a polymeric resin that produces this stopper (9) resistant to the pressure of the injection process and, subsequently, to the external pressure, that is, in the robot's application environment. This allows a large amount of wires/cables (18) to pass together through a tapered hole (14) without compromising the resistance to pressures of the order of 300 atmospheres.

The invention takes advantage of one of the components of the cylindrical part of the composite material pressure vessel (5), an internal part of the laminate called Liner (4), normally used only as an aid in the filament winding process to carry out the passage of hoses inside the pressure vessel wall. This is done by manufacturing this liner (4), which is made of metallic material, through the process of wire electro-erosion, where its internal section is cut with the geometry of channels (15) which are subsequently drilled to allow passage of the hoses. These channels (15) are sized so as to resist external pressure, as the pressure of the environment acts between the hoses and the cavity. Thus, another advantage of the invention emerges, which is the protection of these hoses, which otherwise could suffer efforts when compressed and dragged between the modules (1) and the internal armature of the production ducts (risers) where the robot can act.

The invention uses heat pipe technology (6) to direct the flow of this thermal load to the vessel lids (3) made of metallic material. This is the same cover where we have the conical hole (14) for the passage of conductors through the penetrator (2) and aligned holes (16) for the passage of hoses through the liner (4). Using these components also known as heatpipes, the size of the heatsink plates (13) is conditioned only to the cavity diameter and length.

Figure 2:
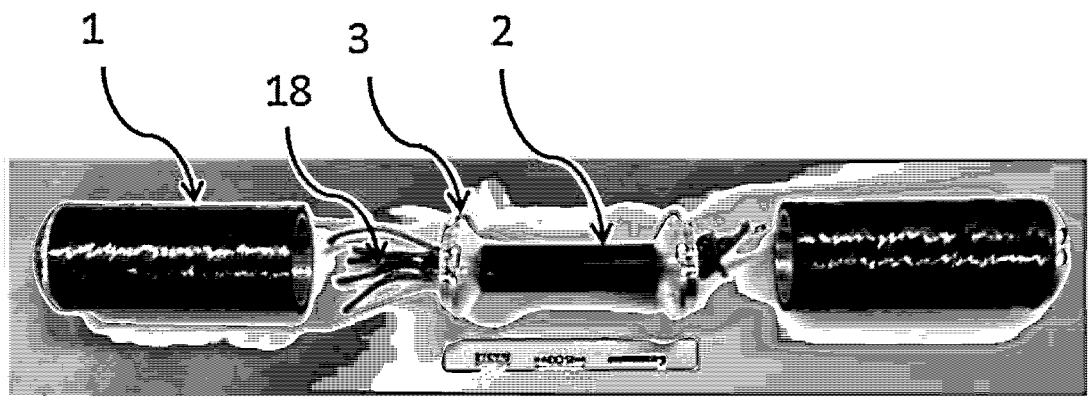
FIG. 2 illustrates a side view of the disassembled components.
Figure 3:
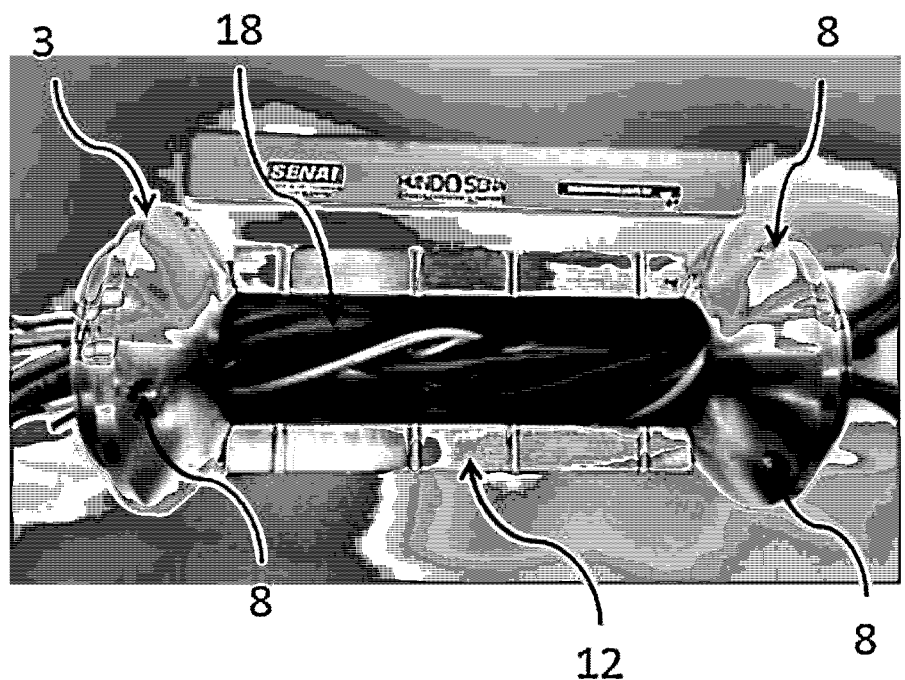
FIG. 3 illustrates a side view of the rubber injection mold prepared for processing.
Figure 4:
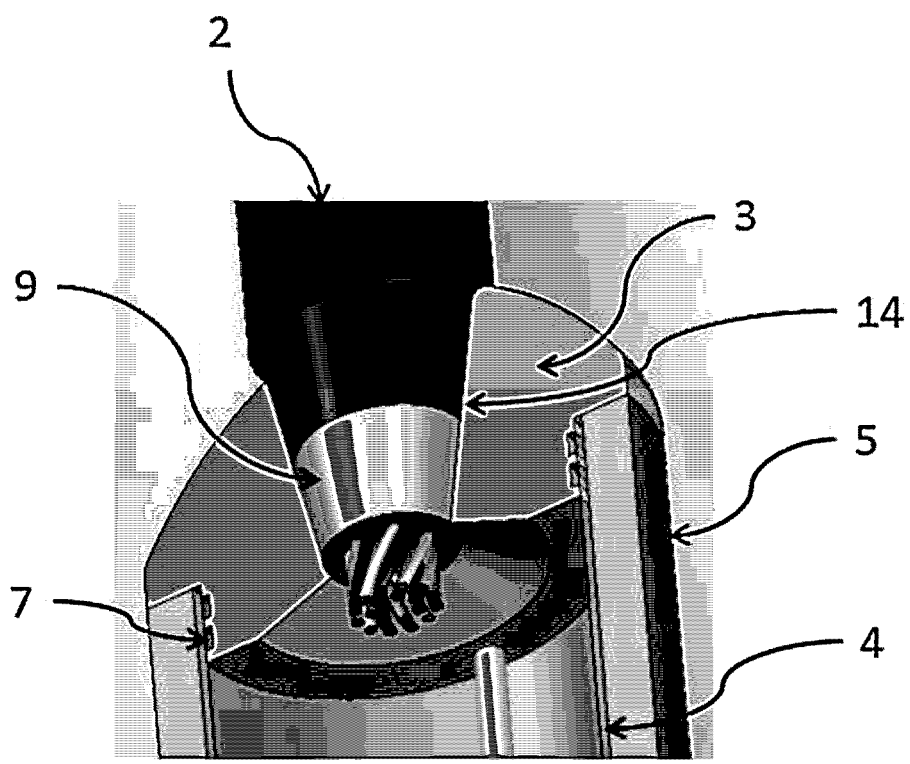
FIG. 4 illustrates a section of the vessel lid showing the resin stopper.
Figure 5:
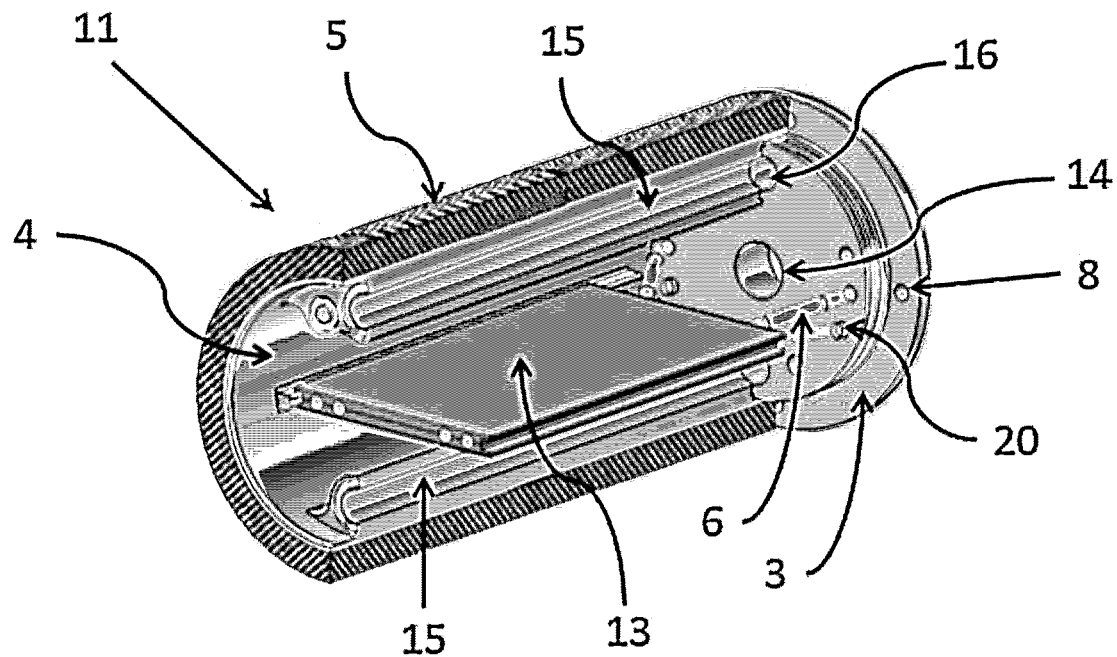
FIG. 5 illustrates a section of the wireless module and electronic components.

As can be seen in FIGS. 4 and 5, the module (1) is shown with the vessel lids (3). In FIG. 2 it is possible to see the vessel lids (3) joined to the penetrator (2) with the wires/cables (18) coming out through the lids (3). It is important to say that in the manufacturing sequence, the rubber vulcanization purposely uses the lids (3) in the injection mold (12), procedure illustrated in FIG. 3, to seal the mold (12) and create the ideal adhesion between rubber and metal. This adhesion is extremely important to guarantee the integrity of the invention, which must withstand the efforts of the internal pressure and flexion of the penetrator (2).

Based on the specification of the wires/cables (18) between the modules, wires/cables (18) are selected and cut to excess length for insertion into the vessel covers (3). The wires/cables (18) are inserted into the tapered hole (14) of the lid (3), a resin in liquid state is prepared in a Becker and then, by pouring, a resin stopper (9) is formed into a fraction of the height of the tapered hole (14) (A process similar to "Casting"). After curing, the process is repeated for the next lid and inserted into the mold as illustrated in FIG. 3.

When closing the mold (12), a rubber injection equipment is placed that fills the mold cavity, unifying the lids (3) and wires/cables (18) in a single component, as shown in FIG. 2. To ensure perfect sealing, before closing, a special adhesive is applied to the internal surfaces of the tapered hole (14) of the vessel lids (3) that facilitates the adhesion of rubber to the metallic material of the lids (3).

Figure 6:
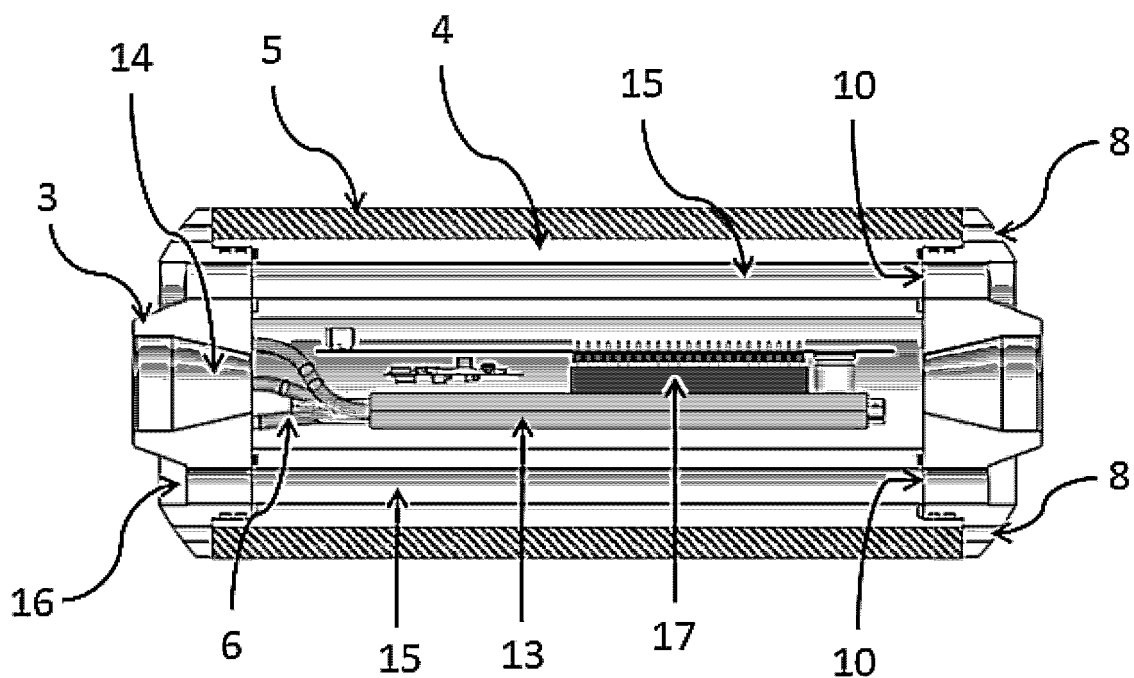
FIG. 6 illustrates a side section of the module with an electronic board mounted on the heat sink.
Figure 7:
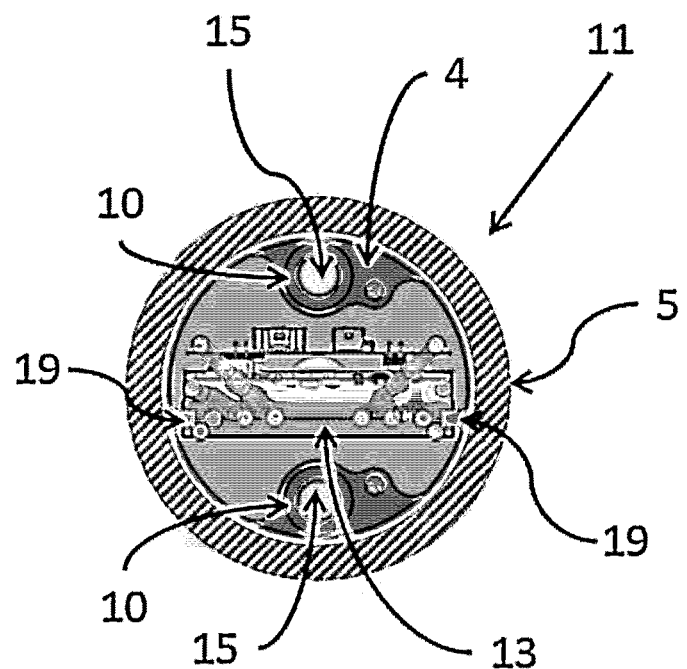
FIG. 7 illustrates a front section of the module with an electronic board mounted on the heatsink.

In FIGS. 5, 6 and 7, the interior of the pressure vessel can be seen, more specifically the liner cavity (4). Around the liner (4) we have a cylinder of composite material (5) made by the filament winding process, this structure guarantees the capacity to resist pressures in the order of 300 atmospheres. When we have this liner (4) internally carved and coated with composite material, we call it the vessel body (11).

A bar made of solid material, which can be made of metal or polymer, is produced in the outer diameter of the liner (4) and in such length that several vessels can be made in the same filament winding process. Then, a filament winding equipment deposits the composite material continuously in a predetermined lamination sequence on the liner (4) until the desired number of layers is reached. Depending on the composite material, post curing is carried out in an oven for a few hours. With the aid of a lathe, the bar wound with composite material is cut into sections with the exact length of the vessel body (11). The solid liner section of these segments is later machined or cut depending on the material to create the internal cavity. In case the liner (4) is metallic, the wire electro-erosion process is used. In this step, caverns inside the liner (4) are created to accommodate the on-board electronics and allow the passage of the aforementioned hoses. And finally, finishes are made by machining, such as o-ring grooves (7) and threads to allow the coupling of the lids.

The vessel lids (3) interface with the liner (4) on one side and with the penetrator (2) on the other side. When mounting the lids, holes in them are aligned with the channels (15) of the liner (4) to allow hoses and/or cables to pass between the modules without the need to enter the vessel. At the interfaces between these we have o-ring seals (10), preventing pressure from entering the interior. In the lids of the vessel (3), from the inside, one of the ends of the heat tubes (6) are inserted so that the thermal energy of the electronic board is dissipated. The other end of the heat tubes (6) is coupled to a heatsink plate (13) which in turn is coupled to the part of the electronic component (17) that needs to dissipate heat. This heatsink plate (13) uses parallel guides (19) carved on the inner side of the liner (4) for its fixation.

As the vessel lid (3) already has the penetrator (2) adhered/integrated, at the other end of the penetrator (2) we have another vessel lid (3) ready to be coupled to another vessel body (11). In these lids, extraction holes (8) on the edges allow screws to be threaded and force them in the direction of extracting them, thus enabling a disconnection between the modules (1).

Therefore, according to the detailed description and figures, the protection module for onboard electronics is nothing more than a liner (4) in cylindrical shape adapted to receive electronic components (17), provided with channels (15), also provided with an outer layer to the liner (4) forming a cylinder of composite material (5), further provided with two vessel lids (3), further provided with at least one stopper (9), further provided with at least one penetrator (2) and seals (7) to ensure the tightness of the module (1)

The invention claimed is:

1. PROTECTION MODULE FOR ON-BOARD ELECTRONICS, characterized in that it comprises a liner in cylindrical shape adapted to receive electronic components, provided with channels and parallel guides, said liner being externally provided with a cylinder of composite material, the module being provided with vessel lids at its ends, which are provided with a stopper, being further provided with a penetrator that interconnect by means of adhesion a lid to Whelk vessel of a first module to another lid of vessel of a second module, seals and o-rings to guarantee the tightness of the module.

2. PROTECTION MODULE FOR ON-BOARD ELECTRONICS, according to claim 1, characterized in that the liner comprises two diametrically, opposed longitudinal channels for the passage of hoses and/or communication cables through the modules, seals of o-rings type, a heatsink plate disposed internally and longitudinally, and heat pipes.

3. PROTECTION MODULE FOR ON-BOARD ELECTRONICS, according to claim 1, characterized in that the vessel lid has a central tapered hole, a hole aligned to the channels of the liner, extraction holes to disconnect the modules, inserts on the inside where the heat tubes are positioned and seals.

4. PROTECTION MODULE FOR ON-BOARD ELECTRONICS, according to claim 1, characterized in that the composite cylinder covers the liner, resisting to pressures in the order of 300 atm.

5. PROTECTION MODULE FOR ON-BOARD ELECTRONICS, according to claim 1, characterized in that the stopper is made of pressure-resistant polymeric resin.

6. PROTECTION MODULE FOR ON-BOARD ELECTRONICS, according to claim 1, characterized in that it resists pressures in the order of 300 atm.

\* \* \* \* \*